May 12, 1925.                                    1,537,790
R. J. ALPE
UNIVERSAL COUPLING AND THE MANUFACTURE THEREOF
Filed Sept. 17, 1923          3 Sheets-Sheet 1

Inventor
Rod J Alpe
By B Singer
Atty

May 12, 1925.  
R. J. ALPE  
1,537,790  
UNIVERSAL COUPLING AND THE MANUFACTURE THEREOF  
Filed Sept. 17, 1923  3 Sheets-Sheet 2

Inventor  
Robert John Alpe

May 12, 1925.
R. J. ALPE
1,537,790
UNIVERSAL COUPLING AND THE MANUFACTURE THEREOF
Filed Sept. 17, 1923      3 Sheets-Sheet 3
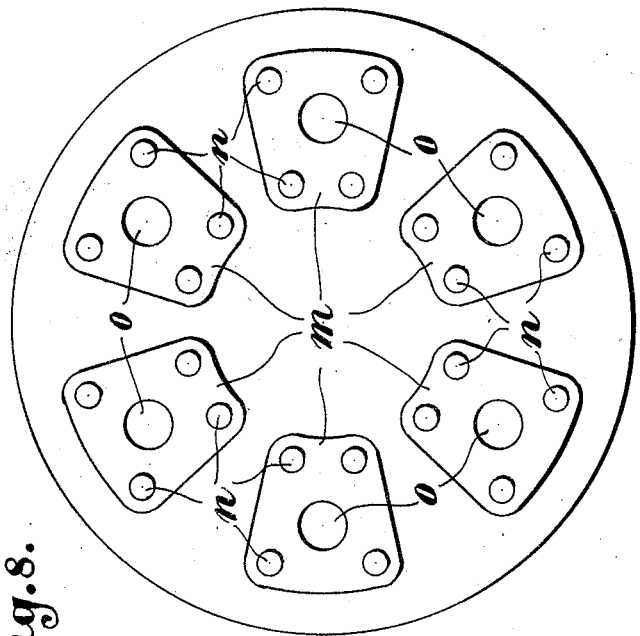
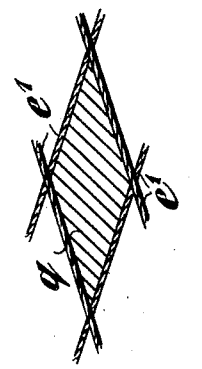
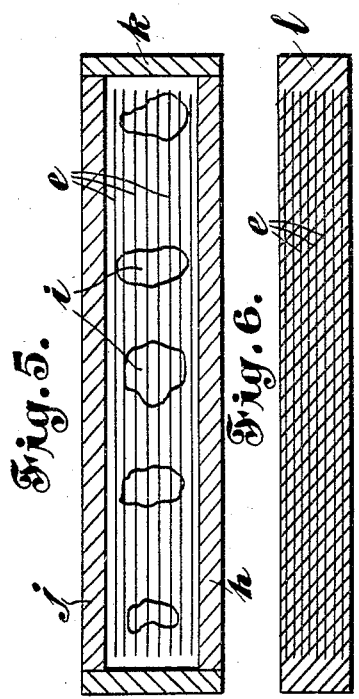
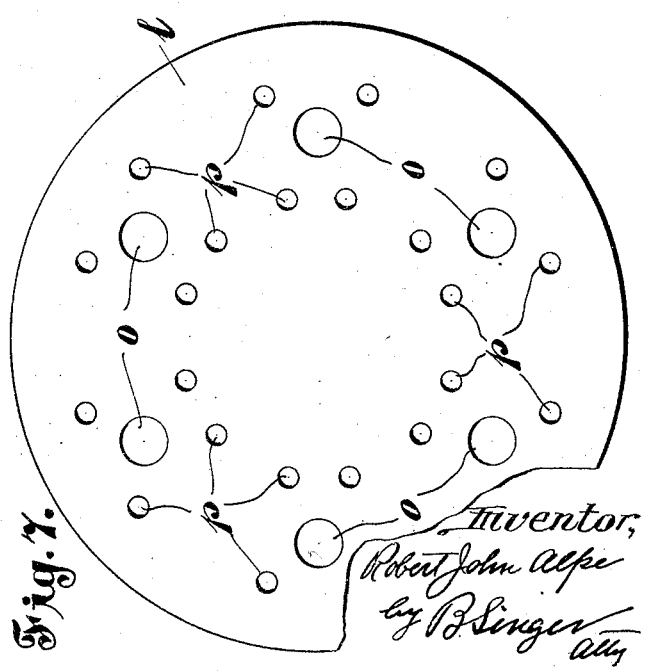

Patented May 12, 1925.

1,537,790

UNITED STATES PATENT OFFICE.

ROBERT JOHN ALPE, OF BIRMINGHAM, ENGLAND.

UNIVERSAL COUPLING AND THE MANUFACTURE THEREOF.

Application filed September 17, 1923. Serial No. 663,266.

*To all whom it may concern:*

Be it known that I, ROBERT JOHN ALPE, a subject of the King of Great Britain, residing at 56 Crompton Road, Handsworth, Birmingham, in the county of Warwick, England, have invented certain Improvements in or Relating to Universal Couplings and the Manufacture Thereof, of which the following is a specification.

This invention comprises certain improvements in or relating to flexible universal couplings, and to the manufacture of such couplings, suitable for the transmission mechanism of automobiles, and for like purposes, and relates more particularly to couplings of the type involving a disc or annulus of non-metallic material, such for example as vulcanized fibre or rubber, which disc is coupled at uniformly spaced concyclic points to the driving and driven elements in such a manner as to permit of an angular disposition of these elements in relation to each other during the transmission of power from one to the other and further involving an internal cord or like reinforcement embodied in said disc or annulus.

The invention has for its purpose the provision of a particularly strong and efficient construction of coupling of this type, wherein the resilient disc or annulus is effectively protected against extreme torsional strains, for example during the starting of the motor or the like, and also against extreme strains in an axial direction, thereby avoiding permanent buckling or distortion of the disc without in any way impairing its necessary resilience, and also facilitating the efficient operation of the coupling even at considerable variations in the angular dispositions of the driving and driven elements.

According to the present invention a flexible universal coupling disc or annulus of the type referred to is provided wherein the cord or like reinforcement is wound in crossed formation and in superposed layers so as to provide an aggregation of intersecting bights of the cord, these intersecting bights of the cord being, in the finished disc or annulus, uniformly separated by substantially diamond-shaped flexible fillings, so that the reinforcement is in its entity enabled substantially to oppose the tensional stresses set up in a circumferential direction, and to thereby avoid permanent buckling or distortion of the disc or annulus due to the stretching action between adjacent pairs of the concentrically-disposed points of attachment. The invention further includes a winding frame whereby the cord or like reinforcement may be conveniently wound, such frame including upstanding main pegs corresponding to the concyclically-disposed points of attachment of the coupling disc, further upstanding secondary pegs corresponding to the rivet holes required for attachment of external stiffening plates for the coupling disc, and an external annular series of closely-spaced upstanding pins or wires around which the bights of the cord are looped in the winding operation.

In order that this invention may be clearly understood and readily carried into practice, reference may be had to the appended explanatory sheets of drawings, upon which:—

Figure 5 is a diagrammatic cross-section showing the cord winding built up into disc formation in readiness for the pressing and vulcanizing operation.

Figure 6 is a similar view of the disc after such operation.

Figure 7 is a plan of Figure 6.

Figure 8 is a plan of the reinforced flexible disc complete with external stiffening plates.

Figures 9 and 10 are diagrammatical views illustrating the flexible lazy-tongs action of the crossed cord reinforcements and their diamond-shaped rubber fillings.

Figure 1:
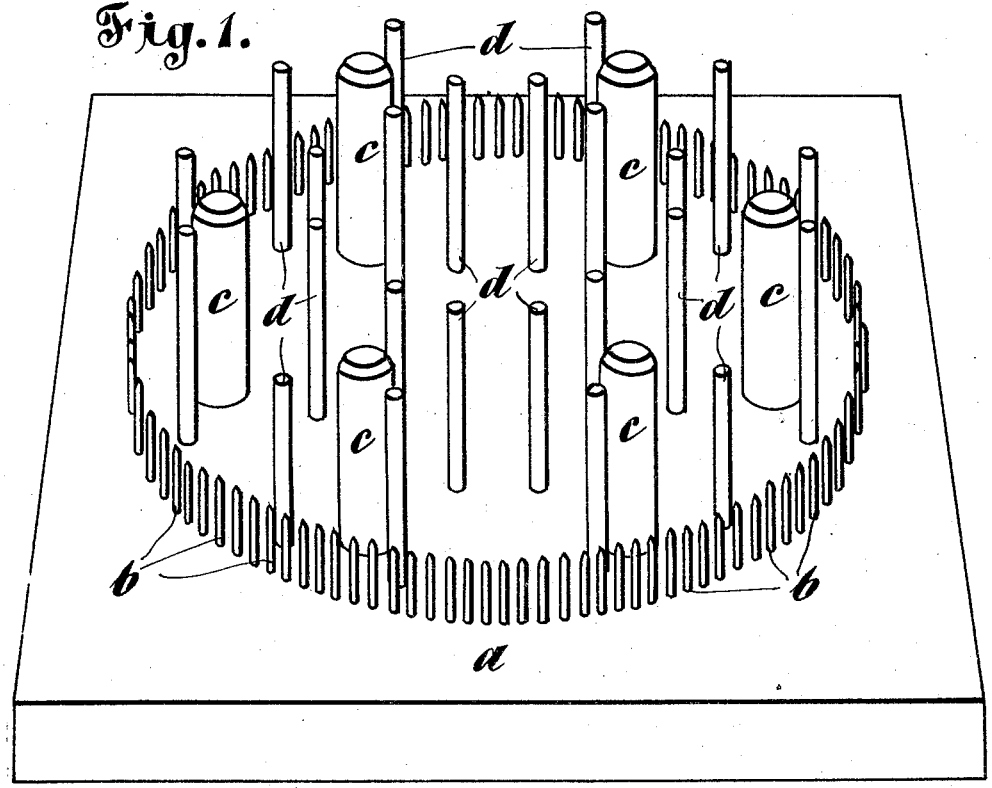
Figure 1 is a perspective view of a winding frame used in the manufacture of a flexible coupling disc or annulus in accordance with the invention.
Figure 2:
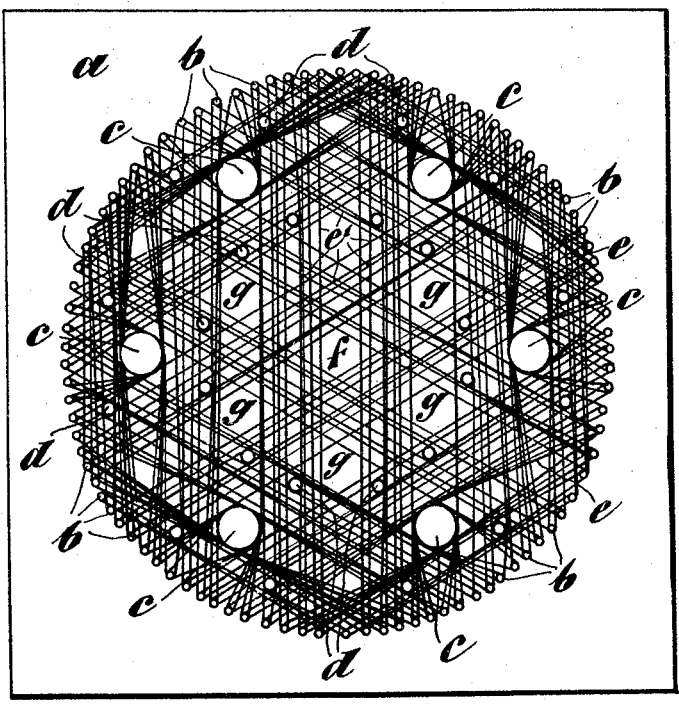
Figure 2 is a plan of the frame shown in Figure 1 and illustrating the method of winding the cord thereon.
Figure 3:
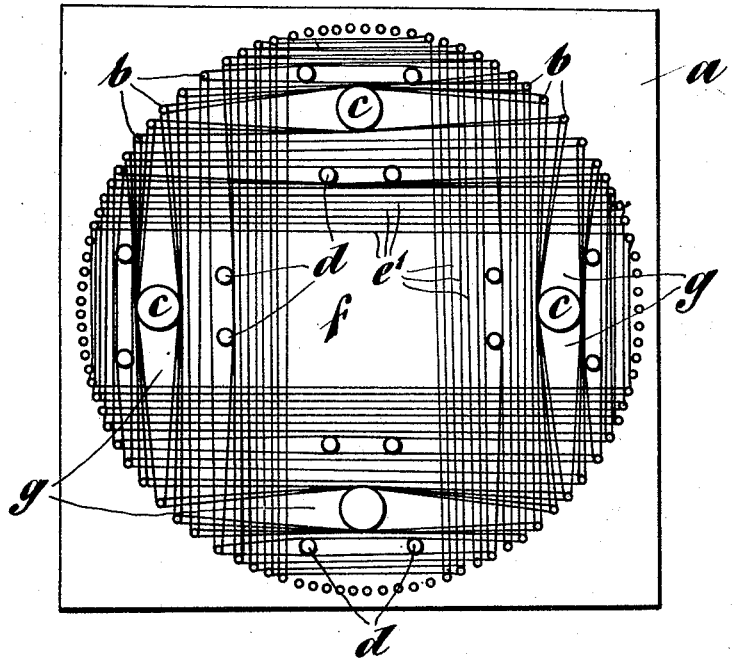
Figure 3 is a plan illustrating a slightly different form of frame and winding.

In a convenient embodiment of the invention a winding frame is provided in which the cord or like reinforcement, after being first thoroughly impregnated with rubber solution, is wound to the desired formation. This frame (see Figures 1 to 3) comprises a base plate *a* having an external series of closely-spaced pins *b* upstanding in annular formation therefrom, the diameter of this annular pin formation corresponding substantially to the diameter of the coupling disc to be produced. Within this annular series of upstanding pins $b$ is provided concentrically an annular series of main pegs $c$ upstanding from the base plate $a$ in uniformly-spaced relation corresponding to the holes required for the points of attachment of the coupling disc, and a further series of smaller secondary pegs $d$ upstanding from the base plate in spaced relation about each of the series of main pegs $c$, so as to correspond to the rivet holes required in connection with the attachment of external stiffening plates on opposite faces of the coupling disc.

The reinforcing cord or the like $e$, preferably in the form of a pure Egyptian cotton cord of substantial tensile strength, say 15 lbs., is wound in successive substantially parallel bights $e^1$ which at their extremities are looped around adjacent pins $b$ of the upstanding annular series these closely-spaced parallel looped bights $e^1$ of the winding being disposed in the plane of the disc and in parallel relation to an alternate pair of the main pegs $c$, on one or both sides thereof, and the layer of parallel cord bights $e^1$ thus provided extending from a circumferential point of the winding frame to a point adjacent the centre thereof, with an intervening central space $f$ and spaces $g$ at points opposite the upstanding pegs $c$ and $d$. On completion of this layer of spaced parallel cord bights $e^1$, the winding is continued at a different angle but in similar manner in a superposed plane, in parallel relation to the next alternate pair of main pegs $c$, and so on around the entire winding frame, this arrangement providing superposed layers of closely-spaced parallel cord bights $e^1$, the bights of the respective layers being disposed in symmetrically crossed or intersecting relation, and the winding being continued to provide a number of superposed layers corresponding to the thickness and strength of coupling disc required.

As the bights $e^1$ of successive layers of this cord winding $e$ are disposed in parallel relation to successive alternate pairs of main pegs $c$, these cord bights $e^1$ of the successive layers, at their points of intersection between adjacent pegs, are disposed obliquely or diagonally in relation to lines directly connecting each adjacent pair of pegs $c$, so that in this manner a multiplicity of more or less diamond-shaped spaces are provided between the cord bights $e^1$ of successive layers of the winding.

Figure 4:
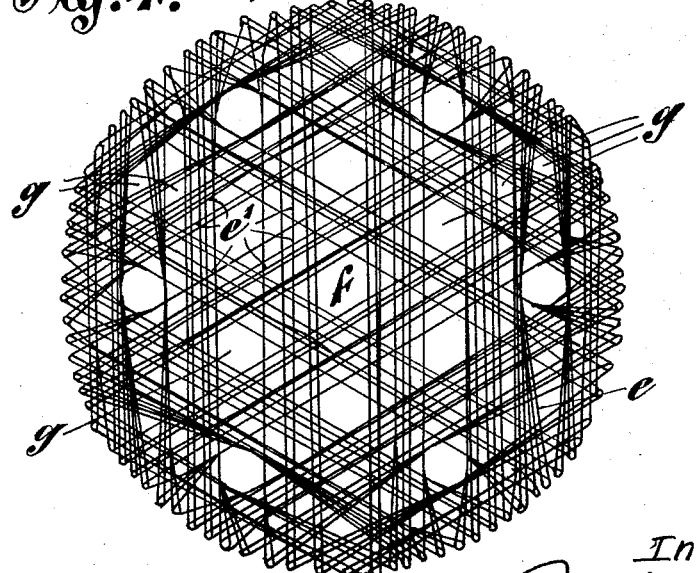
Figure 4 is a plan of the cord winding shown in Figure 2 removed from the winding frame.

On the winding being completed, the cord reinforcement $e$ in its entirety is lifted from the pins and pegs of the winding frame (see Figure 4) and then thoroughly dried for building up into the coupling disc or annulus. This latter operation is effected on a jig (not shown) having pegs designed to ensure perfectly accurate spacing of the holes which constitute the concyclically-disposed points of attachment of the disc. A facing disc $h$ of rubber or the like is first placed in position (see Figure 5), and on the cord winding $e$ being then superposed, the whole of the spaces and loops between the cord bights $e^1$ of the successive layers of the winding are filled in with rubber or the like (partly shown as pieces $i$), an upper facing disc $j$ of rubber or the like is then applied, and finally a peripheral strip $k$ of rubber or the like, the whole being then subjected to vulcanization under great pressure in a vulcanizing mould, the rubber becoming quite plastic during such vulcanization, so as to completely fill in the diamond-shaped spaces and ensure a homogeneous yet perfectly flexible coupling disc or annulus $l$ (see Figures 6 and 7), which may then be fitted with the usual external stiffening plates $m$ secured by rivets $n$ (see Figure 8). In this disc or annulus the concentrically disposed points of attachment for the connecting spiders are indicated at $o$, and the rivet holes at $p$.

When a flexible universal coupling is at work and is pulled over to an angle of about 20 degrees to the normal axis of the disc, as is usual on an automobile, the coupling disc is stretched in a circumferential direction, causing the distances between two adjacent points of attachment of its connecting spiders to be lengthened, this circumferential stretching or lengthening ordinarily causing permanent buckling or distortion of the disc. The diamond-shaped rubber fillings of the present invention, however, under the action of this circumferential stretching or lengthening between adjacent points of attachment $o$, have a kind of lazy-tongs movement which, whilst permitting of the necessary circumferential stretching or lengthening, ensures the complete return of the disc to its normal plane, and thereby entirely avoids permanent buckling or distortion. This feature is illustrated diagrammatically in Figures 9 and 10, in which $q$ represents one of the diamond-shaped rubber fillings between the obliquely or diagonally intersecting bights $e^1$ of the cord reinforcement, Figure 9 showing the filling in its normal condition, and Figure 10 the same filling stretched in the direction of an adjacent pair of attachment points $o$ of the disc.

The intersecting angle of the superposed layers of the cord winding $e$ may be suitably varied, to correspondingly vary the degree of elasticity of the coupling disc to suit varying conditions of power transmssion. Thus, as the looped parallel cord bights $e^1$ of each layer of the winding are disposed in parallel relation to alternate points of attachment *o* of the disc, in a disc having six concyclically disposed points of attachment *o* as illustrated, for engagement with a pair of three-armed spiders, the intersecting angle would be 60 degrees (see Figures 2 and 4), providing diamond-shaped spaces and elastic fillings of a particularly effective character, whilst in the case of a disc having four concyclically-disposed points of attachment for engagement with a pair of two-armed spiders, the intersecting angle would be 90 degrees (see Figure 3), providing spaces and fillings of square formation, which are adapted for the lazy-tongs opening and closing movement in a varying degree.

What I claim as my invention and desire to secure by Letters Patent is:—

1. A flexible universal coupling disc or annulus of the type referred to, wherein the cord or like reinforcement is wound in crossed formation and in superposed layers so as to provide an aggregation of intersecting bights of the cord, forming substantially diamond shaped filling openings and substantially diamond-shaped flexible fillings in said openings which permit of the necessary stretching whilst avoiding permanent buckling or distortion of the disc.

2. A winding frame comprising a base, a series of main pegs upstanding therefrom and corresponding to the concyclically disposed points of attachment of the disc to the driving and driven elements, a series of upstanding secondary pegs corresponding to the rivet holes required for attachment of external stiffening plates for the disc, and an external annular series of closely spaced upstanding pins for the looping of the bights of a cord.

3. The method of forming a flexible coupling disc as set forth in claim 1 by providing a base with upstanding pegs and corresponding to the form of disc to be wound and passing the thread diametrically in various directions so as to embrace all of said pegs, and to form a fabric with substantially diamond-shaped flexible filling openings for the purpose described.

In witness whereof I have hereunto set my hand.

ROBERT JOHN ALPE.